UNITED STATES PATENT OFFICE.

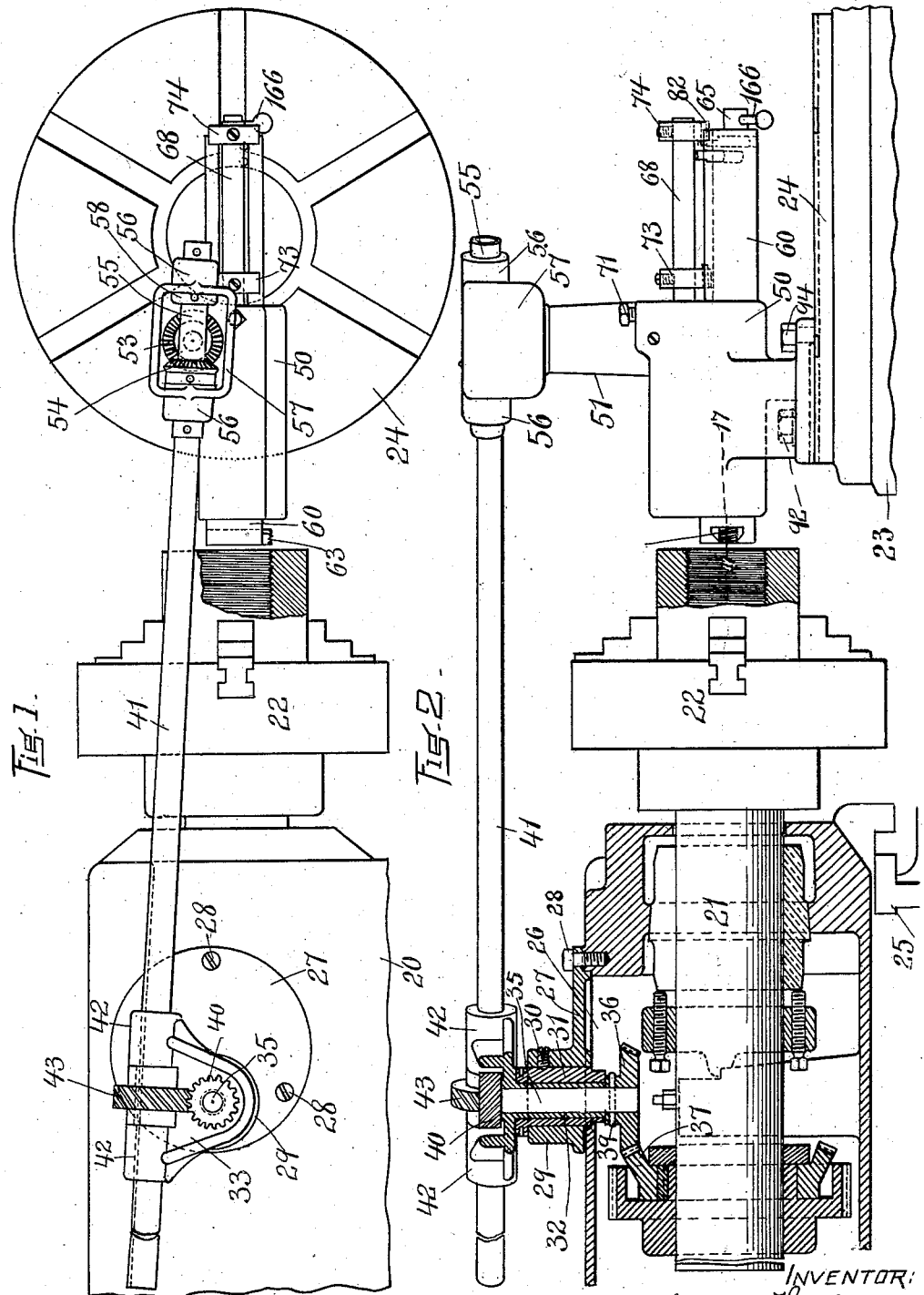

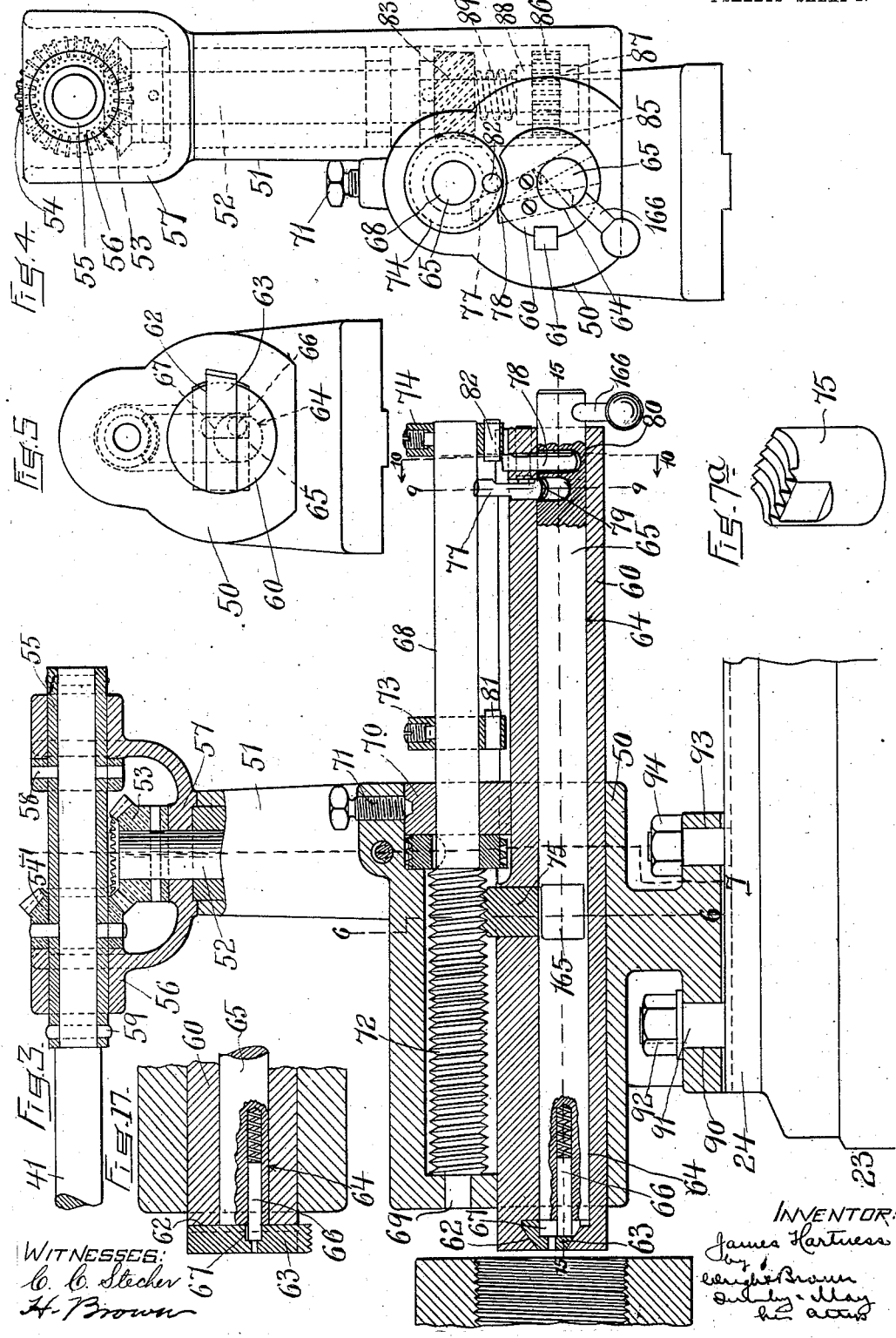

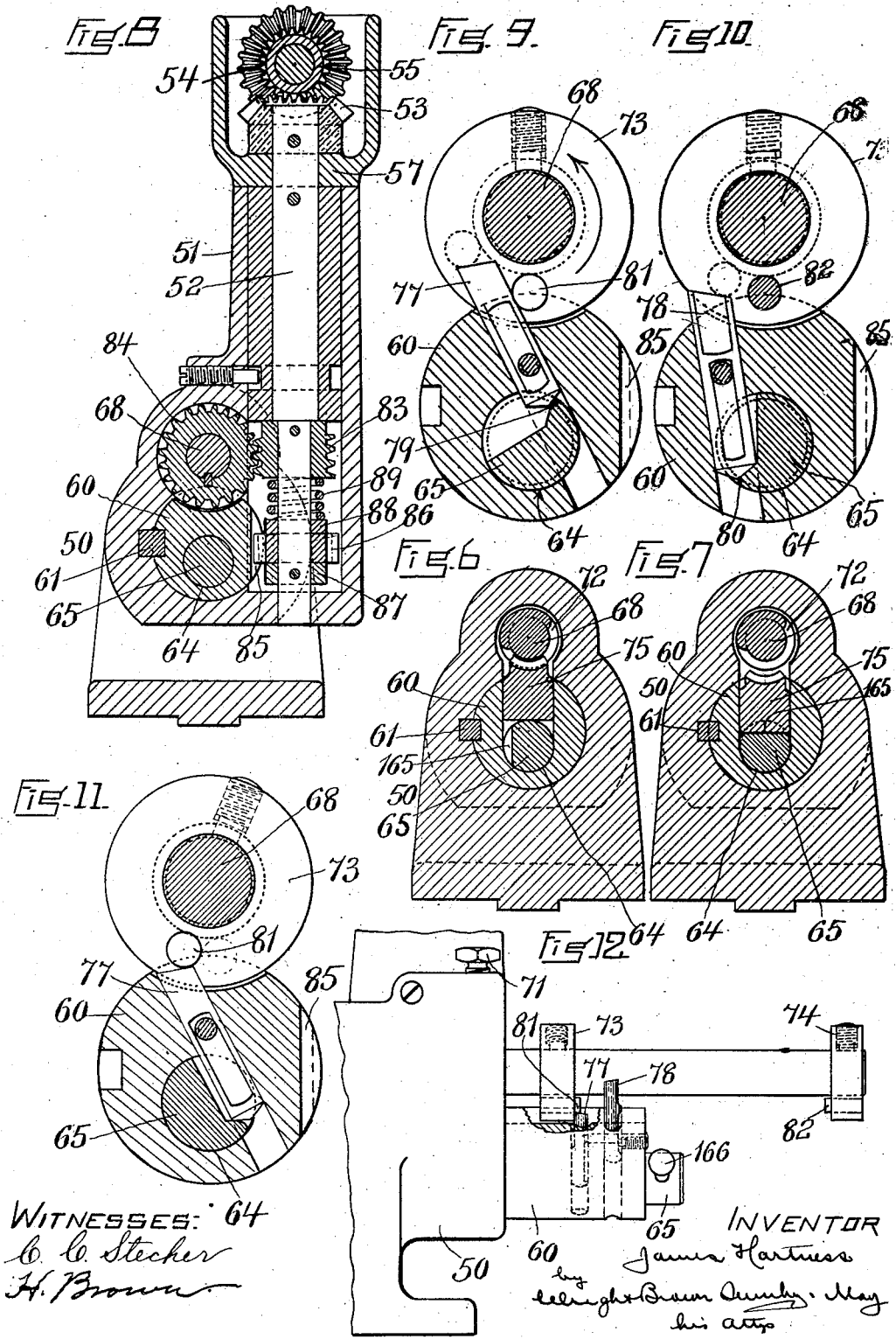

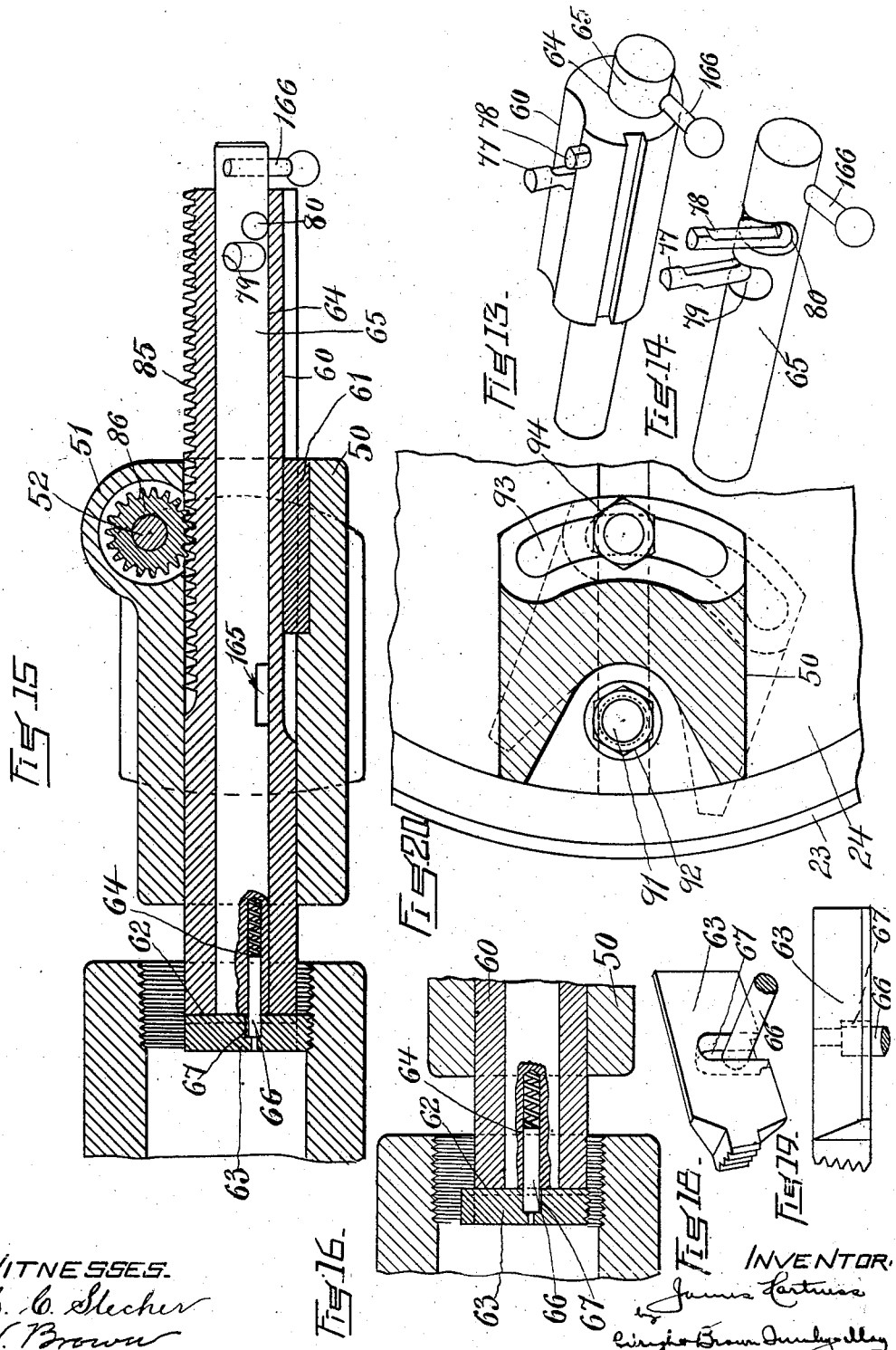

JAMES HARTNESS, OF SPRINGFIELD, VERMONT.

MACHINE FOR CUTTING SCREW-THREADS.

No. 872,728.　　　Specification of Letters Patent.　　　Patented Dec. 3, 1907.

Application filed June 12, 1905. Serial No. 264,778.

*To all whom it may concern:*

Be it known that I, JAMES HARTNESS, of Springfield, in the county of Windsor and State of Vermont, have invented certain new and useful Improvements in Machines for Cutting Screw-Threads, of which the following is a specification.

This invention has relation to metalworking machines and more particularly to mechanisms or appliances for cutting screw-threads, of which there are at present two classes, to wit,—those in which a die is used comprising a number of cutters, the cutting edges of which cause their own advancement or lead along the work, and those in which a chasing bar having a single cutter is advanced either by hand, or by a toolcarriage in turn actuated by a lead screw. In the latter class of machines are the regular engine lathes in which the carriage is controlled by a long lead screw, usually running the entire length of the machine, and also the chasing attachment for brass working lathes, in which a short lead screw is mounted upon the back of the head. In such attachments last referred to this lead screw is adapted to be engaged by a nut-section mounted upon an arm extending upwardly and forwardly from a rod mounted on the bed or the headstock and adapted to slide longitudinally of the bed. This rod also carries an arm upon which is supported a tool-carriage. By swinging the tool-carriage into position, the nut-section is brought against the lead screw. This particular device is generally used in the formation of threads in a brass lathe but is seldom used outside of that class of work. This attachment is quicker in operation than the engine lathe, but it is not as accurate in the control of the lead, whereas while the engine-lathe thread-cutting mechanism is more accurate, still it is unsatisfactory in many respects for chuck work. Moreover, since it is necessary to move the entire carriage in engine lathes, heavy gears are employed in the change-gear mechanism that would not be required to feed a cutter-bar for chasing thereon. Furthermore, the thread - cutting mechanism on engine-lathes usually involves a complication of parts and requires a tapering attachment, in order to produce taper-threads in chuck work.

The present invention has for its object to provide an accurate and simple mechanism for feeding the chasing tool by means of which I may dispense with the heavy feeding gears necessary to move the chasing tool in a carriage.

A further object is to overcome the frail-ties which are found in the chasing attachments as used in brass work, and to provide a mechanism that will be under the most direct control of a lead screw, independent of the feed rod, and which may be set to thread or turn straight or taper work.

According to the embodiment which I have illustrated, the attachment is mounted by a swivel on the top of a flat turret, and it comprises a frame in which a cutter bar is suitably mounted to slide, said bar being under the direct control of a lead-screw, the rotation of which is effected by suitable connections which insures its rotation in proper relation to the speed of the work. It is not essential, however, that the attachment should be mounted upon a turret, as it may be mounted upon any other tool-slide. In order to utilize this attachment, however, upon a turret-lathe such as illustrated in my Letters Patent No. 792,591, granted June 20, 1905, in which the headstock is adapted to slide laterally, the rotating shaft is driven by a suitable connection from the spindle, and said shaft is connected to the headstock by a swiveled head to accommodate the longitudinal and rotative movement of the turret and the lateral travel of the head. As will be hereinafter explained, with a single cutter the work may be threaded or turned externally or internally, and taper work may be turned or threaded with equal facility.

Referring to the accompanying drawings,—Figure 1 represents in plan view a portion of a lathe to which the invention is attached. Fig. 2 represents a front elevation of the same. Fig. 3 represents a longitudinal section of that part of the attachment which is mounted upon the turret and which carries the lead screw. Fig. 4 represents a rear end elevation of the same. Fig. 5 represents a front elevation of a portion thereof. Figs. 6 and 7 represent sections on the line 6—6 of Fig. 3 and respectively show the nut-section engaged with and disengaged from the lead - screw. Fig. 7ª represents the nut - section detached. Fig. 8 represents a section on the line 7—7 of Fig. 3. Fig. 9 is an enlarged section on the line 9—9 of Fig. 3. Fig. 10 is an enlarged section on the line 10—10 of Fig. 3. Fig. 11 represents a section on the line 9—9 of Fig. 3 and illustrates the parts in a position different from that illustrated in Fig. 9. Fig. 12 represents in front elevation the rear end of that portion of the mechanism which is mounted on the turret. Fig. 13 represents in perspective view the rear end of the cutter-bar. Fig. 14 represents the rear end of the oscillatory controller rod which controls the operation of the cutter and the nut section. Fig. 15 represents a horizontal section on the line 15—15 of Fig. 3. Fig. 16 represents a partial section on the same line and shows the cutter as withdrawn from the work. Fig. 17 (Sheet 2) shows the cutter-bar and the cutter in section. Figs. 18 and 19 illustrate the cutter or chaser. Fig. 20 shows in plan view a portion of the turret and illustrates how the angle of the frame of the mechanism on the turret may be varied.

Referring to the accompanying drawings,—20 indicates the headstock in which is suitably journaled the hollow spindle 21 having a chuck 22.

23 indicates a carriage adapted to slide back and forth relatively to the head on ways or shears on the bed, and upon it is mounted the flat turret 24.

As thus far explained, the lathe may be substantially similar to that illustrated in my said Letters Patent No. 792,591, hereinbefore referred to, in which the head 20 is adapted to move laterally to effect a cross-feed of the work.

In Fig. 2, I have shown one of the transverse guides 25 upon which the head is mounted to slide.

The attachment, as a whole, includes a removable frame which may be mounted upon the turret and which carries the lead-screw, the gearing on the headstock, and a sliding rotary shaft which connects the said gear mechanism with the operative devices on the turret.

By examination of Fig. 2, it will be observed that in the cover of the headstock there is an opening 26 which is closed by the circular base of a support or frame 27 secured in place by screws 28. This support is formed with an annular flange 29 in which is secured by a screw 30 an eccentric bushing 31. Swiveled in the bushing is the downwardly extending sleeve 32 of a support or head indicated as a whole at 33. This swiveled head forms a bearing for two shafts, the axes of which are transverse to each other. A perpendicular shaft 35 is journaled in the sleeve 32 and it carries at its lower end a bevel-gear 36 which is adapted to intermesh with and be driven by a bevel-gear 37 upon the spindle 21. The hub of the gear 36 bears against the lower end of the sleeve 32 and the bushing 31, and it is secured to the shaft 35 by a pin 39. It will be seen that the bushing extends above the flange 29, and that it is provided with apertures to receive a spanner, by which it may be rotated to move the gear 36 into and out of mesh with the gear 37. The upper end of the shaft 35 has affixed to it a spiral gear 40 by which power is transmitted to a sliding shaft 41 which extends from the head to the tool-slide. The head or support 33 is of the shape shown in Figs. 1 and 2, and has two bearings 42 42 in which the rod or shaft 41 is loosely journaled. Between the bearings there is a spiral gear 43 which is slidingly keyed to the rod or shaft 41, and which intermeshes with and is driven by the spiral gear 40 hereinbefore referred to. The head 32 rests upon the upwardly projecting end of the eccentric bushing and being loosely journaled in said bushing may swing or rotate relatively thereto.

The mechanism which is mounted upon the turret or tool-slide comprises a frame 50, the base of which is fitted to rest upon and be removably secured to the top of a flat turret such as is used in my machines. Any suitable securing mechanism may be utilized for this purpose. This frame has an offset upright annular flange 51 in which is loosely journaled a head 57. In this head is journaled an upright shaft 52, the lower end of the shaft being journaled in the frame 50, as shown in Fig. 8. Pinned to the upper end of this shaft is a bevel gear 53 which is adapted to be engaged with and driven by a bevel gear 54 pinned to a sleeve 55 mounted in bearings 56 56 carried by the head 57. The sleeve is held against movement axially relatively to its bearings by the gear 54, which abuts against one of said bearings, and a collar 58 pinned thereto which rests against the other of said bearings. The end of the rod or shaft 41 is reduced and is passed into the sleeve 55 to which it is secured by a taper pin 59. By removing the pin 59, the head may be reversed and the shaft introduced into the opposite end of the sleeve which is apertured for the reception of the pin 59. This provides for driving the shaft 52 in either direction at will. The swiveling of the head 57 and the head or support 33 provides for maintaining the gears 54 and 53, and the gears 43 and 40, in proper intermeshed relation, irrespective of the rotative or longitudinal movement of the turret and of the transverse sliding movement of the headstock 20.

The frame 50 is provided with an aperture or guideway for the reception of a longitudinally sliding cutter-bar 60. The guideway or aperture may be cylindrical, as may be the cutter-bar, and hence I provide a key 61 in the frame which extends into a longitudinal slot in the cutter-carrier to prevent its rotation. In the front end of the cutter-bar or the end which is nearest the work, is a transverse dovetailed groove 62 for the reception of the cutter or chaser 63 which is thus adapted to slide transversely of said bar. This bar is located substantially in alinement with the axis of the spindle, so that the chaser or cutter may be held in proper relation to the work. It will be apparent that I may employ a chaser having a number of teeth, as shown, or else a single pointed chaser, if desired.

In order that the cutter or chaser may be moved into and out of operative position, the bar 60 has an eccentric aperture 64, in which is rotatively mounted a controller-rod 65 having on its rear end a handle 166 by which it may be turned. On its front end this controller-rod has an eccentric spring-pressed pin 66, which extends into a transverse slot 67 in the inner face of the cutter or chaser. Consequently, by rotating the rod 65 in its bearing, the cutter 63 may be moved into and out of operative or active position, the pin 66 moving from one dead center position to another. A suitable knock-off mechanism is provided for effecting the automatic rotation of the rod 65.

Immediately above the tool-carrier 60 there is a feed-rod 68, one end 69 of which is journaled in the frame 50 and the middle portion of which is journaled in a box 70, secured by a set-screw 71 in the other end of the frame. This shaft or feed-rod has the lead screw 72 which is located inside of the frame. The rear end of the rod 68 projects to some distance beyond the box 70 and is provided with two adjustable collars 73 74 which coöperate with the knock-off mechanism for operating the controller rod 65 at any desired points in the travel of the cutter-bar. Before describing the operation of these collars and their coöperating mechanism for controlling the rod 65, I may point out that directly beneath the lead screw 72 there is a nut or nut section 75 which is arranged to slide radially in the tool-carrier 60. The lower end of this nut section rests upon the rod 65 which is reduced or cut away so that it forms a cam portion 165, as illustrated in Fig. 10. This cam is so formed that when the rod 65 is rocked to move the chaser or cutter to its active position, the nut section 75 is forced upwardly into positive and operative engagement with the lead screw 72, as shown in Fig. 10, where it is held by said rod. When, however, the rod is rocked to withdraw the cutter or chaser from the work, the flattened portion of the cam is moved under the nut section and the latter is free to drop from engagement with the lead screw. Within the end of the cutter-bar 60 are placed two actuators or pins 77 78 respectively, and they are arranged in sockets which are transverse to the carrier, but which converge upwardly, as shown in Figs. 9, 10, 13 and 14. These two pins rest against shoulders 79 and 80 formed by recessing the rod 65. The shoulder 79 is in the rear of a vertical longitudinal plane coincident with the axis of said rod and the shoulder 80 is in front of said plane. Consequently, by depressing first one pin and then the other, the rod 65 may be rocked in one direction and then in the opposite direction. The projecting ends of the pins 77 78 are beveled, and are adapted to be alternately engaged by projections or studs 81 82, located upon the collars 73 74, respectively. The pin 77 is in advance of the pin 78, and when the cutter-bar has been advanced by the lead screw a sufficient distance, the revolving stud 81 engages the beveled end of the pin 77 and rocks the rod 65 to knock off or move the nut section into inactive position and remove the chaser or cutter to its inactive position and away from the work. The cutter-bar is then retracted by a mechanism which will be explained, until the pin 78 comes into the path of the revolving stud 82, upon which it will be depressed to again rock the rod 65 in the opposite direction so as to force the nut section firmly against the lead screw and to move the chaser or cutter into active or cutting position with relation to the work. The lead screw is rotated continuously from the shaft 52 by means of spiral gears 83 84, the former securely pinned to the shaft 52, and the latter being keyed to the feed-rod 68, between the lead-screw and the box 70, as shown in Fig. 8.

The upper portion of the cutter bar 60 is concaved slightly to permit of the free rotation of the spiral gear 84 and the collars 73 and 74. The rear side of the cutter-bar 60 is formed as a rack or with rack-teeth 85 with which engages a pinion 86 journaled loosely upon the shaft 52. The hub of the gear 86 is held frictionally against a friction ring or collar 87 pinned to the shaft 52 by a slidable friction ring or collar 88 and a spring 89, which is interposed between the last-mentioned collar and the hub of the spiral gear 83. The tendency of the friction members under the tension of the spring 89 is to rotate the pinion 86 in a direction to retract the cutter-carrier except when the nut section is engaged with the lead screw, in which event the carrier will be forced positively towards the work and the pinion 86 will rotate idly in the opposite direction to the disks 87 88.

I have already stated that the base of the frame 50 may be attached to the turret by any suitable means, but I preferably construct the base in the following manner, so that the work may be taper-turned, or taper work may be threaded. That is to say, I form in the base an aperture 90 through which a pivoted bolt 91 may be passed upwardly from the flat face of the turret. A nut 92 on the bolt holds the base of the frame firmly against the said turret. At some little distance in the rear of the aperture 90 is a segmental slot 93 which is the arc of a circle circumscribed about the center of the aperture 90. The bolt 93 whose head is affixed to the top of the turret extends upwardly through the slot and is provided with a nut 94. By loosening the nut 94, the whole frame 50 with the parts thereon may be swung about the axis of the bolt 91 so that the tool-carrier may be caused to advance at an angle to the axis of the work. In this way, I provide for turning a taper without the employment of a special templet or taper-turning mechanism.

Inasmuch as the lathe is provided with the cross-sliding headstock, the work may be moved laterally with relation to the tool in the tool-carrier, and hence the same cutter, whether it be a chaser or a turning cutter, may be used for threading or turning either the interior or the exterior of the work.

In the operation of the machine, the power will be transmitted from the spindle to the shaft 52 through the medium of the sliding rod 41 and the gearing which connects the said rod with the said shafts. The manner in which the two heads are swiveled upon their respective supports or frames prevents any of the parts from binding, and enables the attachment to be used for bar or chucking work of any size or diameter.

While it will be understood that I prefer to use an interchangeable lead screw for each pitch of thread to be cut, yet I would not regard it as a departure from my invention to include change-gearing in the mechanism which is mounted upon the turret. By the use of change-gears, the same chasing apparatus may be used for a few lead screws or even with a single lead screw. A few interchangeable lead screws might be preferred, to insure the meshing of the chaser in its work each time. This would be insured for instance by the employment of a four-pitch lead screw which would cut threads which would be multiples of four.

According to the present embodiment of the invention, the cutter bar 60 is projected at its front end from the frame in which it is mounted, but where the attachment is to be used entirely for external work or for internal work having a large diameter, I would prefer to extend the support for the said bar beyond the outer end of the bar when at its extreme limit of movement. The cutter in that event would pass through a slot in the main casting.

Having thus explained the nature of the invention, and described a way of constructing and using the same, although without attempting to set forth all of the forms in which it may be made, or all of the modes of its use, I declare that what I claim is:—

1. An attachment for a lathe comprising a support or frame adapted to be attached to the tool-slide of the lathe, a lead-screw journaled on said support or frame, a cutter arranged to move on said support or frame, connections between the cutter and the lead-screw, and power-transmitting connections independent of the slide-moving mechanism of the lathe for transmitting power from the work-rotating mechanism to the lead-screw.

2. An attachment for a turret-lathe comprising a frame adapted to be attached to the turret, a movable cutter on the frame, a lead-screw and nut on the frame for moving the cutter independently of the movement of the turret, and swivel connections for driving the lead-screw from the work-rotating mechanism adapted to be connected to the head-stock and turret respectively.

3. In a turret lathe, a bed, a head-stock having work-rotating mechanism, a carriage, a turret, and a cutting attachment comprising a frame on the turret, a cutter, a nut and a lead-screw mounted on the frame for feeding the cutter, a power-transmitting shaft extending from the head-stock longitudinally of the bed towards the frame and power-transmitting connections connecting said shaft respectively with the work-rotating mechanism in the head-stock and with the said lead-screw.

4. An attachment for a lathe comprising a frame adapted to be attached to the tool-slide, a cutter-bar movable in said frame, a lead-screw journaled on said frame and movable with the tool-slide, means independent of the slide-moving mechanism for rotating said lead-screw to feed the cutter-bar, and means on said frame independent of the lead-screw for retracting the cutter-bar when the nut is disengaged from the lead-screw.

5. An attachment for a lathe comprising a support adapted for attachment to the head-stock, a support adapted for attachment to the tool-slide, swiveled heads on said supports, a shaft journaled in said heads and slidable with relation to one of them, means on the first-mentioned support by which power is transmitted to said shaft, a cutter on the second-mentioned support, and means on said second-mentioned support for transmitting power from said shaft to said cutter.

6. An attachment for a lathe comprising a support adapted for attachment to the head-stock, a support adapted for attachment to the tool-slide, a shaft journaled on said supports and slidable with reference to one of them, means on the first-mentioned support for transmitting power to said shaft, a cutter on the second-mentioned support, and means on said second-mentioned support for transmitting power from said shaft to said cutter.

7. The combination of a frame adapted for attachment to the tool-slide of a lathe, a cutter-bar thereon, a lead-screw journaled in said frame, a nut connected to the cutter-bar, a cutter arranged transversely on said bar and movable relatively thereto, and means for moving said cutter and nut relatively to said bar simultaneously into and out of active positions.

8. The combination of a frame adapted for attachment to the tool-slide of a lathe, a cutter-bar thereon, a lead-screw journaled in said frame, a nut connected to the cutter-bar, a cutter movable transversely on said bar, and automatic mechanism for moving said cutter and nut into inactive positions.

9. The combination of a frame adapted for attachment to the tool-slide of a lathe, a movable cutter-bar thereon, yieldingly driven gearing tending constantly to retract the cutter-bar, a positively driven lead-screw on said frame, and a nut connected to the cutter-bar and adapted to be engaged with the lead-screw to feed the cutter-bar relatively to the frame and the lead-screw.

10. The combination of a frame adapted for attachment to a lathe, a movable cutter-bar thereon, a nut connected to the cutter-bar, a lead-screw journaled on the frame and adapted to positively feed the cutter-bar, a rack on the cutter-bar, and a yieldingly driven pinion intermeshing with said rack to retract the cutter-bar when the nut and lead-screw are disengaged.

11. The combination of a frame adapted for attachment to a lathe, a cutter-bar mounted to slide thereon, a lead-screw on the frame, a nut connected to the cutter-bar and movable into and out of engagement with the lead-screw, yieldingly driven gearing tending constantly to withdraw the cutter-bar, and automatic mechanism operable to throw the nut into and out of engagement with the lead-screw.

12. An attachment for turret lathes comprising the combination with a power-transmitting shaft, of a frame having a lead-screw thereon, a head on the frame, a shaft journaled on said head, means comprising an upright shaft geared to said power-transmitting shaft for connecting said shaft to the lead-screw, and means for swiveling said head on the frame.

13. An attachment for lathes comprising the combination with a power-transmitting shaft, of a frame having a lead-screw thereon, an upright shaft geared to the lead-screw and having a gear on its upper end, a head swiveled on the frame about the axis of the upright shaft, a gear journaled on the head and intermeshing with said last-mentioned gear, and provisions for connecting said gear on the head to said power-transmitting shaft.

14. The combination with a cutter-bar having a rack, a lead-screw, a nut connected to the cutter-bar, means by which the nut may be engaged with the lead-screw, a shaft, gearing connecting the lead-screw and the shaft, and a yielding pinion on the shaft intermeshing with the rack, said lead-screw and said pinion being rotated to respectively advance and retract the cutter-bar.

15. In a mechanism of the character described, the combination of a frame, a cutter-bar arranged to slide longitudinally on said frame and having a transverse guideway, a cutter arranged to slide in said guideway transversely of said cutter-bar, and automatic mechanism comprising a member for moving said cutter and stops alternately coöperating with said member, for alternately advancing and retracting said cutter to and from active position.

16. In a mechanism of the character described, a combination of a frame, a cutter-bar arranged to slide in said frame and having a transverse guideway in its end, a cutter mounted to slide in said guideway, and a member within said cutter-bar for moving said cutter relatively to said cutter-bar, and a nut and a lead-screw parallel to said cutter-bar for moving said cutter-bar relatively to said frame.

17. In a mechanism of the character described, the combination of a frame, a cutter-bar on said frame, a nut and a lead-screw for moving said cutter-bar on said frame, a cutter arranged to slide transversely of said cutter-bar, and a controller rod located within said cutter-bar and having an eccentric pin on its end for actuating said cutter.

18. An attachment for a lathe comprising a frame adapted to be secured to the tool-slide of the lathe, a cutter mounted to slide on said frame, lead-screw mechanism on said frame for actuating said cutter, removable gearing adapted to be secured to the head-stock of the lathe for operative engagement with the work-rotating mechanism, and extensible means connecting said gearing with the said lead-screw mechanism on the frame.

19. An attachment for a lathe comprising a frame adapted to be secured to the tool-slide, a cutter-bar on said frame, a lead-screw journaled on said frame, a nut-section located in a socket in the cutter-bar and adapted to connect said cutter-bar with said lead-screw, a rocking-controller rod within said cutter-bar for actuating said nut-section, and means for automatically rocking said controller rod.

In testimony whereof I have affixed my signature, in presence of two witnesses.

JAMES HARTNESS.

Witnesses:
MARTIN J. MEARA,
C. PREUTZLIEU.